(12) United States Patent
Back

(10) Patent No.: US 11,745,596 B2
(45) Date of Patent: Sep. 5, 2023

(54) BRAKE CONTROL DEVICE AND BRAKE CONTROL METHOD FOR VEHICLE USING AUTO LEVELING SENSOR AND ELECTRONIC BOOSTER

(71) Applicant: GM GLOBAL TECHNOLOGY OPERATIONS LLC, Detroit, MI (US)

(72) Inventor: Bongbum Back, Incheon (KR)

(73) Assignee: GM Global Technology Operations LLC, Detroit, MI (US)

( * ) Notice: Subject to any disclaimer, the term of this patent is extended or adjusted under 35 U.S.C. 154(b) by 494 days.

(21) Appl. No.: 17/032,444

(22) Filed: Sep. 25, 2020

(65) Prior Publication Data

US 2021/0129679 A1 May 6, 2021

(30) Foreign Application Priority Data

Sep. 26, 2019 (KR) .................... 10-2019-0119012

(51) Int. Cl.
*B60T 8/30* (2006.01)
*B60L 7/26* (2006.01)
*B60L 15/20* (2006.01)

(52) U.S. Cl.
CPC ............. *B60L 7/26* (2013.01); *B60L 15/2009* (2013.01); *B60L 2240/12* (2013.01); *B60L 2250/26* (2013.01); *B60T 2270/602* (2013.01); *B60Y 2400/81* (2013.01)

(58) Field of Classification Search
CPC .... B60L 7/26; B60L 15/2009; B60L 2240/12; B60L 2250/26; B60T 2270/602; B60T 8/18; B60T 8/30; B60T 8/58; B60Y 2400/81

USPC ......................................................... 303/198
See application file for complete search history.

(56) References Cited

U.S. PATENT DOCUMENTS

| 4,453,778 A * | 6/1984 | Smith ....................... B60T 8/18 303/22.7 |
| 4,560,210 A * | 12/1985 | Tani ...................... B60T 13/244 60/545 |
| 4,565,067 A * | 1/1986 | Tani ....................... B60T 13/52 60/591 |
| 6,566,864 B1 * | 5/2003 | Brown ............. B60G 17/01933 324/207.2 |
| 6,819,995 B2 * | 11/2004 | Bellinger .............. B60W 10/18 701/53 |
| 8,412,485 B2 * | 4/2013 | Brown .................. G01G 19/08 73/1.13 |

(Continued)

FOREIGN PATENT DOCUMENTS

| KR | 10-0254338 B1 | 11/1996 |
| KR | 10-0183126 B1 | 4/1998 |

*Primary Examiner* — Thomas W Irvin
(74) *Attorney, Agent, or Firm* — Quinn IP Law

(57) ABSTRACT

The present invention relates to a brake control device and a brake control method for a vehicle comprising a plurality of brakes which are respectively installed on wheels, the brake control device comprising an auto leveling sensor which senses a load state of the vehicle according to a change in an angle; a control unit which calculates a correction value according to the load state of the vehicle sensed by the auto leveling sensor; and an electronic brake booster which corrects a predetermined braking power set according to a brake pedal force with the calculated correction value so that the braking operation of each brake is made.

2 Claims, 4 Drawing Sheets

(56) References Cited

U.S. PATENT DOCUMENTS

| | | | | |
|---|---|---|---|---|
| 8,678,975 | B2* | 3/2014 | Koike | B60T 8/3275 |
| | | | | 477/4 |
| 9,056,537 | B2* | 6/2015 | Eberling | B60W 10/18 |
| 10,889,272 | B2* | 1/2021 | Lee | G01S 13/867 |
| 10,894,534 | B2* | 1/2021 | Hiller | B60T 8/323 |
| 11,300,440 | B2* | 4/2022 | Gao | G01G 3/08 |
| 11,413,970 | B2* | 8/2022 | Beck | B60L 7/26 |
| 2005/0017574 | A1* | 1/2005 | Weiberle | B60T 13/741 |
| | | | | 303/3 |
| 2018/0052037 | A1* | 2/2018 | Minoshima | B60G 17/0182 |
| 2019/0084540 | A1* | 3/2019 | Kasper | B60T 8/176 |
| 2019/0126892 | A1* | 5/2019 | Lee | B60W 30/09 |
| 2019/0337499 | A1* | 11/2019 | Hiller | B60T 7/042 |
| 2021/0053448 | A1* | 2/2021 | Beck | B60W 50/00 |
| 2021/0162965 | A1* | 6/2021 | Mellings | B60T 8/1755 |

* cited by examiner

[Fig. 1]
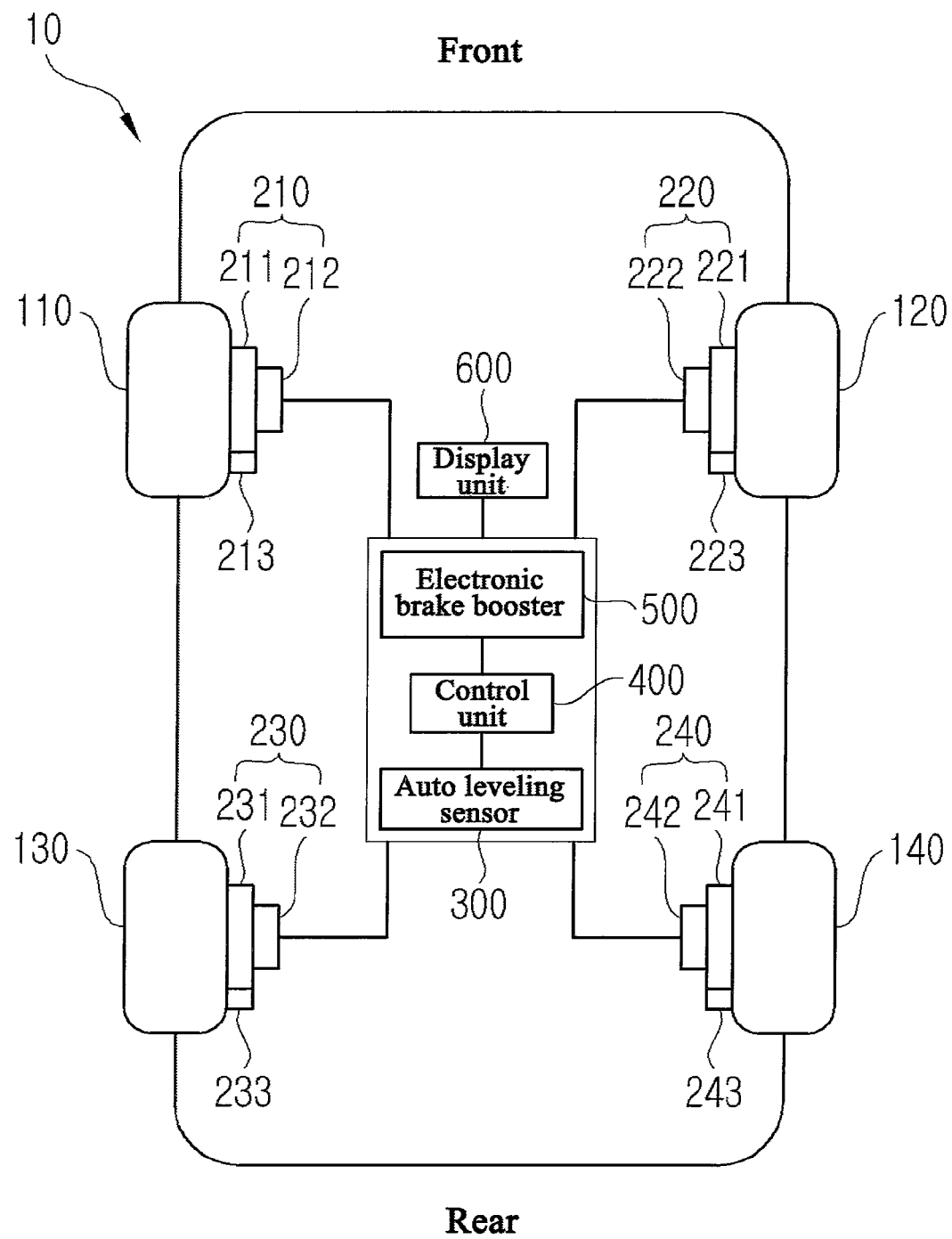

[Fig. 2]
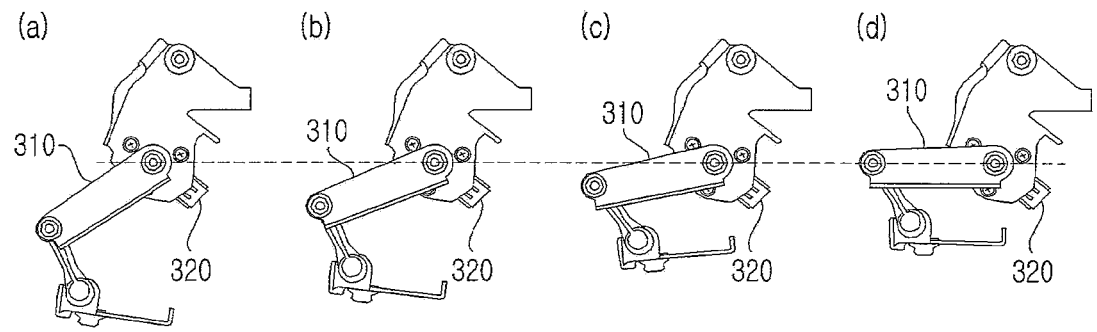
[Fig. 3]
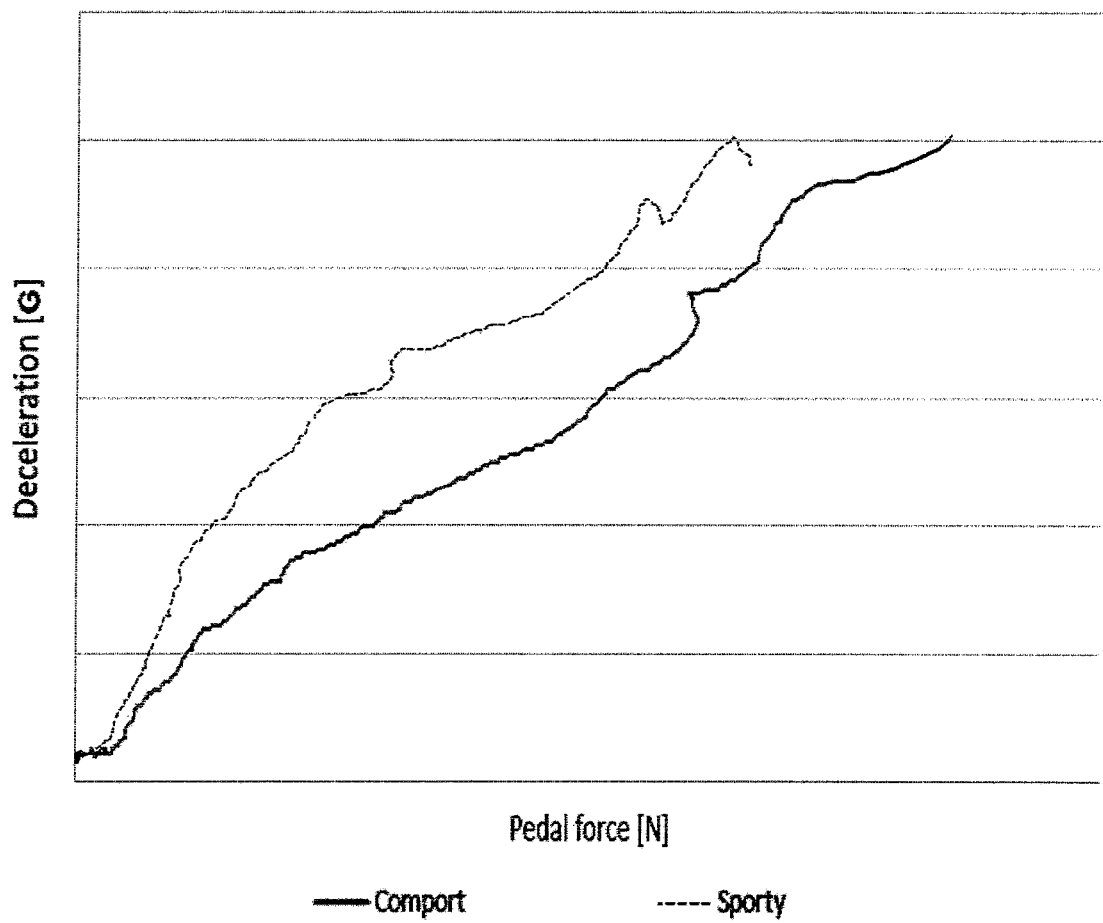

[Fig. 4]
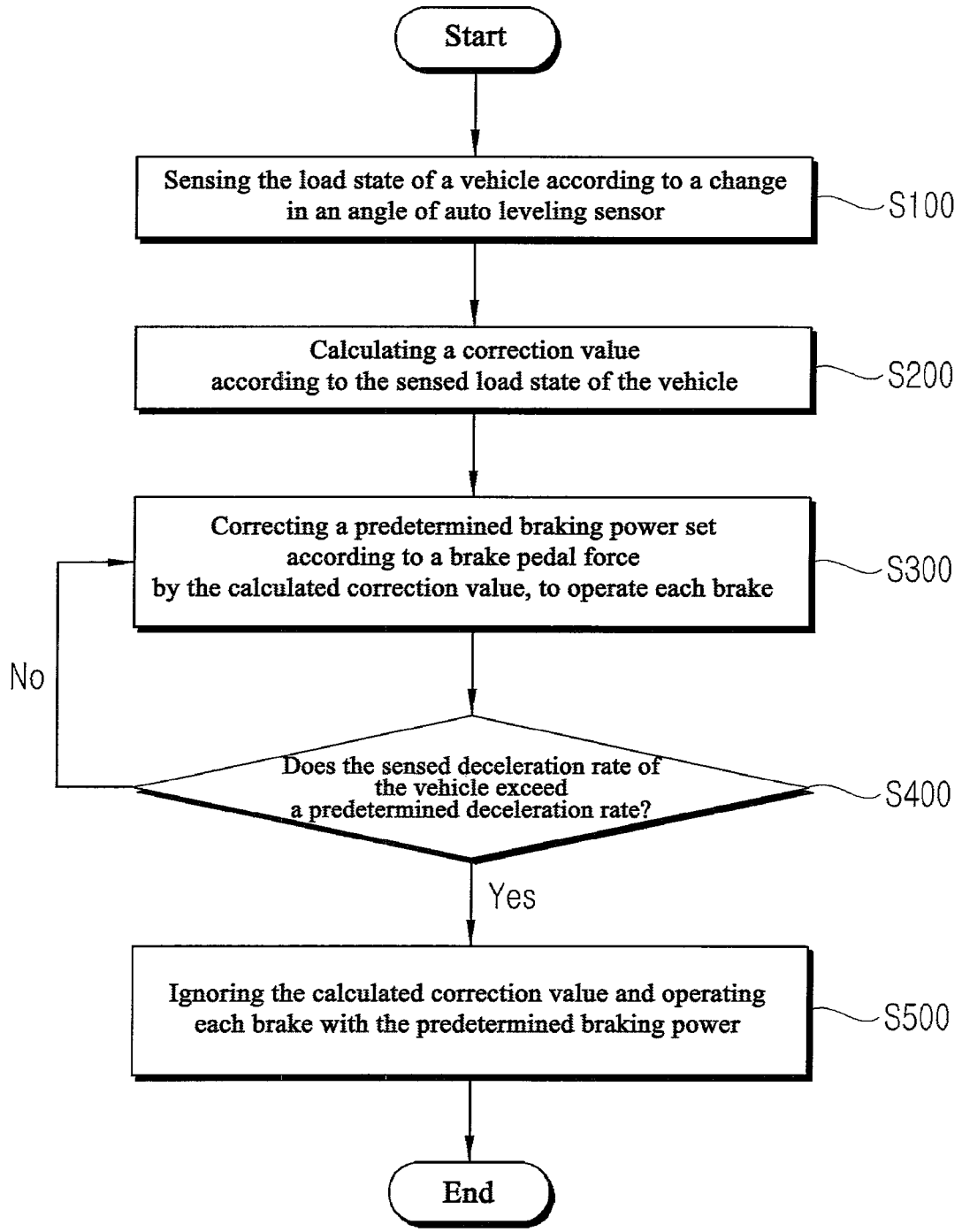

[Fig. 5]
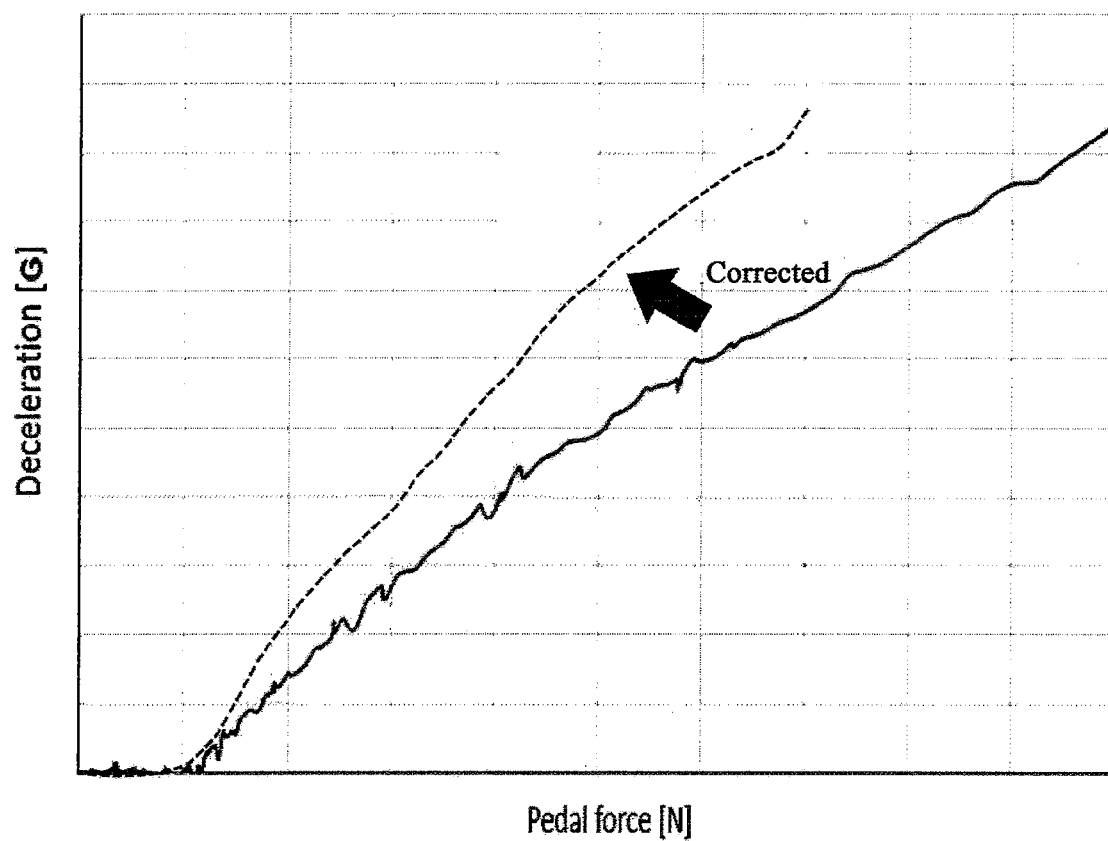

BRAKE CONTROL DEVICE AND BRAKE CONTROL METHOD FOR VEHICLE USING AUTO LEVELING SENSOR AND ELECTRONIC BOOSTER

TECHNICAL FIELD

The present invention relates to a brake control device and a brake control method for a vehicle, more specifically, to a device for controlling a brake for a vehicle and a brake control method using an auto leveling sensor and an electronic booster.

BACKGROUND ART

Operating brakes for stopping a vehicle needs a large amount of power if a brake pedal force alone is used. In order to make up for this, brake boosters which increase the brake pedal force to operate the brakes are installed.

As to the brake boosters, in general, vacuum-type or air-type brake booster devices are installed.

This device is also called hydro master, and the brake booster devices receive vacuum in an intake manifold or a vacuum pump and increase the brake pedal force.

However, these mechanical brake boosters simply amplify the brake pedal force as above, and the amplified amount of the pedal force does not change depending on the weights of a vehicle.

Therefore, in case where a lot of people get on the vehicle or a large amount of luggage is loaded, when the brake is operated with the same brake pedal force, the braking power is insufficient, and thereby the braking distance increases.

Additionally, in order to exhibit the same braking performance, a greater pedal force should be applied to the brake pedal, which requires much energy for drivers to operate the brake.

Patent documents 1 and 2 disclose an anti-lock braking system (ABS). The system in patent documents 1 and 2 estimates the analyzed results obtained by accumulating dozens of times the braking performance according to the deceleration rate and braking hydraulic pressure when stopping a vehicle after the driving starts. In order to calculate an accurate correction value of the braking power, a certain amount of time needs to pass after the driving starts, that is, the brakes need to be operated a certain number of times.

PRIOR ART

Patent Document (Patent document 1) KR 10-0254338 B1
(Patent document 2) KR 10-0183126 B1

SUMMARY OF THE INVENTION

Technical Task

The present invention was invented in order to solve the above-mentioned problems. It is an object of the present invention to provide a brake control device and a brake control method for a vehicle which exhibits a stable braking performance by sensing the weight of the vehicle in advance and correcting the braking power therefrom.

Means for Solving Technical Task

In order to achieve the above-mentioned object, the present invention provides a brake control device for a vehicle comprising a plurality of brakes which are respectively installed on wheels, which comprises an auto leveling sensor which senses a load state of the vehicle according to a change in an angle; a control unit which calculates a correction value according to the load state of the vehicle sensed by the auto leveling sensor; and an electronic brake booster which corrects a predetermined braking power set according to a brake pedal force with the calculated correction value so that the braking operation of each brake is made.

Preferably, the brake control device further comprises a speed sensor which senses a deceleration rate of the vehicle upon braking operation of the brake according to the correction value, wherein when the sensed deceleration rate exceeds a predetermined deceleration rate, the electronic brake booster ignores the correction value so that the braking operation of each brake is made with the predetermined braking power set according to the brake pedal force.

Additionally, the present invention provides a brake control method for a vehicle comprising a plurality of brakes which are respectively installed on wheels, which comprises the steps of: (a) sensing a load state of the vehicle according to a change in an angle of an auto leveling sensor; (b) calculating, by the control unit, a correction value according to the load state of the vehicle sensed by the auto leveling sensor; and (c) correcting, by an electronic brake booster, a predetermined braking power set according to a brake pedal force by the calculated correction value so that the braking operation of each brake is made (S300).

After the step (c), preferably, the brake control method further comprises the step of (d) when a deceleration rate of the vehicle sensed by a speed sensor exceeds a predetermined deceleration rate, ignoring, by the electronic brake booster, the correction value so that the braking operation of each brake is made with the predetermined braking power (S500).

Effect of the Invention

The brake control device and brake control method for a vehicle according to the present invention senses a change in the weight of the vehicle according to the load state of the vehicle using an auto leveling sensor, and changes to the braking performance suitable for the sensed weight of the vehicle before a driver starts the engine and drives. Accordingly, even when the driver steps on the brake pedal with the same pedal force, regardless of an increase in the weight of the vehicle, the same braking performance of the brake is instantly exhibited right after the driving starts. Also, the phenomenon that the brake feels spongy due to braking performance degradation caused by the increase in the weight of the vehicle is inhibited, thereby preventing the risk of accidents as well as providing the stable braking feeling.

Also, the present invention verifies the functions of the auto leveling sensor, thereby preventing the danger that may occur when the auto leveling sensor does not function properly.

BRIEF DESCRIPTION OF THE DRAWINGS

FIG. 1 is a schematic view illustrating a brake control device for a vehicle according to a preferred embodiment of the present invention;

FIG. 2 illustrates the location of a link of an auto leveling sensor in each load state of a vehicle, which is one component of the brake control device for the vehicle according to the preferred embodiment of the present invention;

FIG. 3 is a graph showing the braking performance of a brake for each mode (comport, sporty) using an electronic brake booster;

FIG. 4 is a flow chart of a brake control method for a vehicle according to a preferred embodiment of the present invention; and FIG. 5 is a graph showing the brake performance when 1 person gets on the vehicle and when the vehicle is full, and that the performance of the brake can be improved by the brake control device and brake control method for the vehicle.

DETAILED DESCRIPTION FOR CARRYING OUT THE INVENTION

The above-mentioned object, characteristics and other advantages of the present invention will be much more clarified by describing preferred embodiments of the present invention in detail with reference to the accompanying drawings. During this process, the thickness of lines or the sizes of constitutional elements, etc., illustrated in the drawings may be exaggeratedly illustrated for the sake of clarity and convenience. Also, the terms which will be mentioned later are defined in consideration of the functions in the present invention, and they may vary depending on the intention of users and operators or practice. Therefore, the definition of these terms should be described based on the contents throughout the present specification.

Additionally, the embodiments described are provided as examples for explaining the invention, and are not intended to limit the technical scope of the present invention.

Hereinafter, the brake control device and brake control method for a vehicle according to the preferred embodiment of the present invention are described in detail with reference to the drawings.

First of all, with reference to FIG. 1 to FIG. 3, the constitution of the brake control device for a vehicle according to the preferred embodiment of the present invention is described in detail.

As illustrated in FIG. 1, the brake control device for a vehicle according to the present invention is a device for controlling brakes respectively installed on a plurality of wheels provided in the vehicle.

In the present embodiment, as to the vehicle 10, a four-wheel vehicle with four wheels is described as an example.

Four wheels 110, 120, 130, 140 include a left front wheel 110 located at a front left side of the vehicle, a right front wheel 120 located at a front right side of the vehicle, a left rear wheel 130 located at a rear left side of the vehicle, and a right rear wheel 140 located at a rear right side of the vehicle.

A first brake to a fourth brake 210, 220, 230, 240 are respectively installed on the wheels 110, 120, 130, 140, and each brake 210, 220, 230, 240 may include a plurality of brake pads (or brake shoes) and oil hydraulic cylinders.

The first brake pad 211 and the first oil hydraulic cylinder 212 are installed on the left front wheel 110, the second brake pad 221 and the second oil hydraulic cylinder 222 are installed on the right front wheel 120, the third brake pad 231 and the third oil hydraulic cylinder 232 are installed on the left rear wheel 130, and the fourth brake pad 241 and the fourth oil hydraulic cylinder 242 are installed on the right rear wheel 140.

Furthermore, each oil hydraulic cylinder 212, 222, 232, 242 is connected to a master cylinder (not illustrated). Accordingly, as the master cylinder converts a force that a driver steps on the brake pedal into hydraulic pressure and applies the same to each oil hydraulic cylinder 212, 222, 232, 242, each brake pad 211, 221, 231, 241 operates, and thereby the braking of each wheel 110, 120, 130, 140 is made.

Meanwhile, the vehicle of the brake control device for a vehicle according to the present invention can be a three-wheel vehicle or a two-wheel vehicle as well as a four-wheel vehicle, and the same number of brakes as the number of wheels can be installed.

Also, each brake 210, 220, 230, 240 may be any known brakes such as pneumatic brakes other than hydraulic brakes.

The brake control device for a vehicle according to the preferred embodiment of the present invention comprises an auto leveling sensor 300, a control unit 400, an electronic brake booster 500, and a speed sensor.

The auto leveling sensor 300 is installed on the vehicle 10 to sense the load state of the vehicle 10, i.e., the weight thereof.

In general, the auto leveling sensor 300 is linked to headlights and used to adjust an irradiation angle of the headlights according to the location (height) of the vehicle changed by the weight of the vehicle.

The auto leveling sensor 300 is installed at one side of the body of the vehicle 10 and senses a change in the location (angle) of a link 310 according to the load state of the vehicle 10 through a hall sensor 320, thereby sensing a change in the weight of the vehicle 10.

The electronic brake booster 500 generates the braking power of the brake using electronic control, unlike a conventional vacuum-type brake booster which receives vacuum in an intake manifold or a vacuum pump to mechanically increase the force of stepping on the brake pedal.

Specifically, the conventional brake booster simply amplifies a brake pedal force through vacuum. By comparison, the electronic brake booster 500 electronically controls the brake so that proper deceleration can be made with a predetermined braking power set according to a brake pedal force of the vehicle.

As illustrated in FIG. 3, when the electronic brake booster is used, the braking power of the brake can be adjusted in a different way even with the same brake pedal force depending on various driving modes (comport or sporty).

The predetermined braking power is a value which controls the master cylinder that applies hydraulic pressure (or air pressure, etc.) to each oil hydraulic cylinder 212, 222, 232, 242 of each brake 210, 220, 230, 240 as above, and the value can be set depending on the driving modes as above. Additionally, the braking power is preferably set based on the state where 1 person gets on the vehicle, but is not limited thereto.

The control unit 400 calculates a correction value to correct the predetermined braking power according to the load state of the vehicle 10 sensed by the auto leveling sensor 300.

The speed sensor senses the speed of the vehicle 10. A plurality of speed sensors in the embodiment illustrated in FIG. 1 include first to fourth speed sensors 213, 223, 233, 243, and are respectively installed on the wheels 110, 120, 130, 140, to sense the number of rotation of each wheel and sense the speed of the vehicle 10, but is not limited thereto, and can be constituted to sense the speed of the vehicle by other methods.

Hereinafter, the brake control method for a vehicle according to the preferred embodiment of the present invention is described in detail with reference to FIG. 4 and FIG. 5.

First of all, the load state of the vehicle 10 is sensed according to a change in an angle of the auto leveling sensor 300 (S100).

When the vehicle 10 starts, the load state of the vehicle 10 is sensed according to the angle of the link 310 of the auto leveling sensor 300.

As illustrated in FIG. 2, the current load state (weight) of the vehicle 10 is sensed as to whether only a driver gets on, two or four people get on (full), or luggage more than that is loaded.

Next, a correction value is calculated by the control unit 400 according to the load state of the vehicle 10 sensed by the auto leveling sensor 300.

The control unit 400 calculates a correction value for the electronic brake booster 500 to correct the predetermined braking power, according to the load state of the vehicle 10 sensed by the auto leveling sensor 300.

The correction value is calculated in the manner that the heavier the load state, i.e., the weight, of the vehicle 10 sensed by the auto leveling sensor 300, the greater the predetermined braking power, and the calculated correction value is used to control the electronic brake.

Next, by means of the electronic brake booster 500, the predetermined braking power set according to a brake pedal force is corrected by the correction value, and thereby the braking operation of each brake 210, 220, 230, 240 is made.

When explaining the state where one person gets on or four people get on (full) as an example, before the predetermined braking power is corrected, the electronic brake booster 500 shows the braking performance based on the predetermined state where one person gets on the vehicle as above.

As illustrated in FIG. 5, regarding the deceleration rate of braking with respect to the brake pedal force, when one person gets on the vehicle (broken line) and the vehicle is full (solid line), the deceleration rate based on 100N petal force is reduced when the vehicle is full compared to when one person gets on the vehicle, due to the vehicle weight.

In other words, as to the states where only one driver gets on the vehicle and four people get on the vehicle, when the brake pedal is stepped on with the same force, the deceleration rate is reduced when four people get on the vehicle compared to when one person gets on the vehicle.

However, as illustrated in FIG. 5, the predetermined braking power is corrected upwardly (the arrow in FIG. 5) through the correction value to control each brake 210, 220, 230, 240 so that even when the driver steps on the brake pedal with the same force as that applied when one person gets on the vehicle, the same braking performance of the brake can be exhibited for the state where four people get on the vehicle. Thereby, the phenomenon that the brake feels spongy due to the increase in the weight of the vehicle is inhibited, thereby providing the stable braking feeling as well as preventing the risk of accidents.

Afterwards, when the deceleration rate of the vehicle 10 sensed by the speed sensors 213, 223, 233, 243 exceeds a predetermined deceleration rate, the correction value is ignored, and the braking operation of each brake 210, 220, 230, 240 is made with the predetermined braking power.

As above, when the driver operates the brake pedal while four people get on the vehicle, each brake 210, 220, 230, 240 is operated by the braking power corrected according to the correction value.

However, when the auto leveling sensor 300 does not work properly, a problem may occur in sensing the load state of the vehicle 10, and accordingly, the vehicle 10 may be sensed as full even though the vehicle 10 is not actually in the full state.

In this case, the braking of each brake 210, 220, 230, 240 is made with the braking power increased by the correction value when the vehicle 10 is not full. Therefore, the vehicle 10 exhibits much greater braking performance than when one person gets on the vehicle. In serious cases, there may be rapid deceleration of the vehicle like sudden braking.

Therefore, the speed sensors 213, 223, 233, 243 sense the deceleration rate of the vehicle 10 when each brake 210, 220, 230, 240 operates with the corrected braking power. In case where the sensed deceleration rate is greater than the predetermined deceleration rate, the electronic brake booster 500 ignores the correction value calculated by the control unit 400 when controlling each brake 210, 220, 230, 240 afterwards, and operates the braking of each brake 210, 220, 230, 240 with the predetermined braking power.

Also, in this case, the problem in functions of the auto leveling sensor 300 as above can be notified to the driver through a display unit 600 such as a display device, etc. installed inside the vehicle 10.

As such, the risk that may occur due to sudden braking caused by function problem of the auto leveling sensor 300 can be prevented.

As described above, the brake control device and brake control method for a vehicle according to the present invention senses a change in the weight of the vehicle according to the load state of the vehicle using an auto leveling sensor, and changes to the braking performance suitable for the sensed weight of the vehicle before a driver starts the engine and drives. Accordingly, even when the driver steps on the brake pedal with the same pedal force, regardless of an increase in the weight of the vehicle, the same braking performance of the brake is instantly exhibited right after the driving starts. Also, the phenomenon that the brake feels spongy due to braking performance degradation caused by the increase in the weight of the vehicle is inhibited, thereby preventing the risk of accidents as well as providing the stable braking feeling.

Also, the present invention verifies the functions of the auto leveling sensor, thereby preventing the danger that may occur when the auto leveling sensor does not function properly.

The preferred embodiments of the present invention are explained as above, but the present invention is not limited to the above-mentioned specific embodiments. In other words, a person having ordinary skill in the art to which the present invention pertains can make multiple changes and modifications of the present invention without deviating the idea and scope of the accompanying claims, and all equivalents to proper changes and modifications should be construed as falling within the scope of the present invention.

EXPLANATION FOR REFERENCE NUMERALS

10: vehicle
110: left front wheel
120: right front wheel
130: left rear wheel
140: right rear wheel
210: first brake
211: first brake pad
212: first oil hydraulic cylinder
213: first speed sensor

220: second brake
221: second brake pad
222: second oil hydraulic cylinder
223: second speed sensor
230: third brake
231: third brake pad
232: third oil hydraulic cylinder
233: third speed sensor
240: fourth brake
241: fourth brake pad
242: fourth oil hydraulic cylinder
243: fourth speed sensor
300: auto leveling sensor
400: control unit
500: electronic brake booster
600: display unit

What is claimed is:

1. A brake control device for a vehicle comprising a plurality of brakes which are respectively installed on wheels, comprising:

an auto leveling sensor which senses a load state of the vehicle according to a change in an angle;

a control unit which calculates a correction value according to the load state of the vehicle sensed by the auto leveling sensor;

an electronic brake booster which corrects a predetermined braking power set according to a brake pedal force with the calculated correction value so that the braking operation of each brake is made; and a speed sensor which senses a deceleration rate of the vehicle upon braking operation of the brake according to the correction value;

wherein when the sensed deceleration rate exceeds a predetermined deceleration rate, the electronic brake booster ignores the correction value so that the braking operation of each brake is made with the predetermined braking power set according to the brake pedal force.

2. A brake control method for a vehicle comprising a plurality of brakes which are respectively installed on wheels, comprising the steps of:

(a) sensing a load state of the vehicle according to a change in an angle of an auto leveling sensor (S100);

(b) calculating, by the control unit, a correction value according to the load state of the vehicle sensed by the auto leveling sensor (S200);

(c) correcting, by an electronic brake booster, a predetermined braking power set according to a brake pedal force by the calculated correction value so that the braking operation of each brake is made (S300); and (d) when a deceleration rate of the vehicle sensed by a speed sensor exceeds a predetermined deceleration (S400), after the step (c), ignoring, by the electronic brake booster, the correction value so that the braking operation of each brake is made with the predetermined braking power (S500).

* * * * *